(12) United States Patent
Hopkins et al.

(10) Patent No.: US 7,236,564 B2
(45) Date of Patent: Jun. 26, 2007

(54) LINEAR ARRAY DETECTOR SYSTEM AND INSPECTION METHOD

(75) Inventors: Forrest Frank Hopkins, Cohoes, NY (US); Andrew Joseph Galish, West Chester, OH (US); William Robert Ross, Rotterdam, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/519,271

(22) Filed: Sep. 12, 2006

(65) Prior Publication Data

US 2007/0034805 A1  Feb. 15, 2007

(51) Int. Cl.
*G01N 23/04* (2006.01)

(52) U.S. Cl. .......................... 378/57; 378/58; 378/62; 378/98.8; 250/366

(58) Field of Classification Search ................. 378/19, 378/53, 57–59, 62, 98.8, 98.9; 250/366
See application file for complete search history.

(56) References Cited

U.S. PATENT DOCUMENTS

| 4,179,100 A | 12/1979 | Sashin et al. ............... 250/416 |
| 4,187,427 A | 2/1980 | Cusano ........................ 250/366 |
| 4,303,860 A | 12/1981 | Bjorkholm et al. .......... 250/363 |
| 4,560,882 A | 12/1985 | Barbaric et al. ........... 250/487.1 |
| 6,167,110 A | 12/2000 | Possin et al. .................. 378/19 |
| 6,246,747 B1 | 6/2001 | Wear et al. ................. 378/98.9 |
| 6,546,075 B1 | 4/2003 | Chartier et al. ............... 378/98 |
| 6,740,041 B2 | 5/2004 | Faulkner et al. ............. 600/449 |

FOREIGN PATENT DOCUMENTS

| JP | 3183984 | 8/1991 |
| WO | WO2004/008967 | 1/2004 |

*Primary Examiner*—Edward J. Glick
*Assistant Examiner*—Jurie Yun
(74) *Attorney, Agent, or Firm*—Penny A. Clarke; Patrick K. Patnode (57) ABSTRACT

A linear array detector (LAD) for scanning an object is provided. The detector includes a scintillator layer configured for generating a number of optical signals representative of a fraction of an incident X-ray beam passing through the object. The plane of the scintillator is parallel to the X-ray beam. The LAD further includes a two dimensional array of photo-conversion elements configured to receive several X-rays of the X-ray beams and configured to generate corresponding electrical signals. An arrangement of the photo-conversion elements is independent of the X-ray paths.

24 Claims, 9 Drawing Sheets

LINEAR ARRAY DETECTOR SYSTEM AND INSPECTION METHOD

BACKGROUND

The invention relates generally to imaging systems and more specifically to a method and system for acquiring images.

Many industrial inspection systems require very high detection efficiency, excellent signal-to-noise performance and coverage. In addition, it is desired that the overall cost of the industrial system is reasonable.

Linear detection arrays may be used for various low energy and high-energy x-ray inspection applications. Such detector arrays receive X-rays emitted by a source and passing through an object that is required to be scanned. Typically such arrays have limited flexibility as the detectors generally involve fixed geometry configurations.

Figure 1:
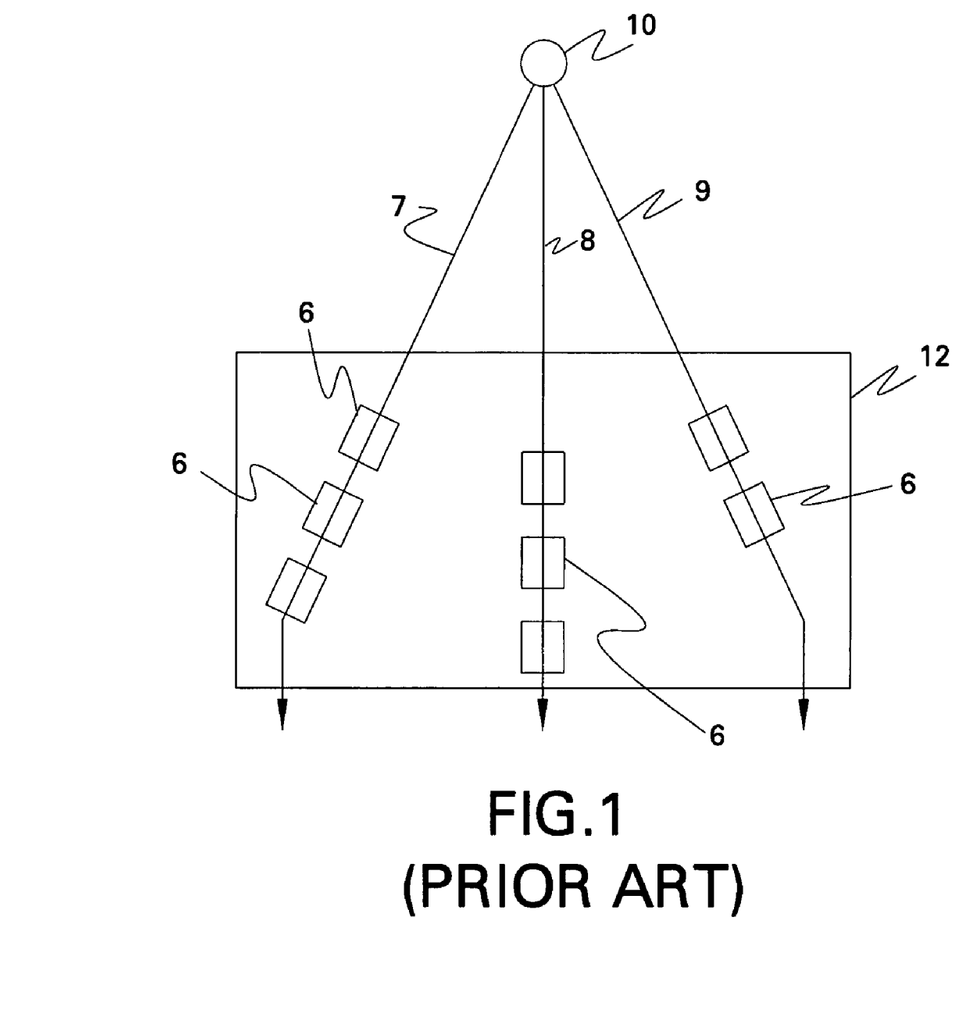
FIG. 1 is a block diagram of an exemplary, conventional X-ray inspection system.

Typically, such detectors include a scintillator layer and a photoconversion device. The photoconversion device has many photosensor elements. The photosensor elements are arranged based on one or more pre-determined paths that the X-rays follow. FIG. 1 is a block diagram of a conventional X-ray inspection system. X-ray source 10 generates an X-ray beam with X-ray paths 7, 8 and 9 respectively. The photosensor elements 6 are aligned with respect to the respective X-ray paths. Thus, for a particular source-to-detector distance (SDD), photosensor elements are focally aligned with the respective X-ray path.

Current X-ray inspection methods typically produce spectrum dependent information by performing two or more different scans, where each scan is achieved with a particular voltage setting of an industrial x-ray tube, typically in conjunction with an energy-integrating detector. Another method is to use a detector with two or more separate distinct layers in succession of the same or different, attenuating materials.

In a multi-layer approach, lower energy X-rays tend to be attenuated in the first layer, and higher energy X rays tend to penetrate through to and be attenuated by the second layer. Another method is to use a photon counting detector which produces an amplitude spectrum of absorbed energy and which can be binned in energy to provide energy separation. All of these methods, generally referred to as energy discrimination, allow the extraction of information on material-specific constituents, rather than information on electron density provided by energy-integrating detectors.

It may also be required that inspection systems be configured to identify and/or quantify specific materials in an object, which is particularly useful in several nondestructive testing and security inspection applications. However, a conventional inspection image data set, produced with a single source spectrum and an energy-integrating detector, permits only the extraction of information on material density. Usually, little information on the amounts of specific materials can be extracted from these conventional image data sets.

Therefore, there is a need to design detectors that are capable of scanning various arbitrary geometries for different source to detector distances, while maintaining high x-ray detection efficiency, spatial resolution and material-specific detection capability.

BRIEF DESCRIPTION

Briefly, according to one embodiment of a linear array detector (LAD) for scanning an object, the LAD includes a scintillator layer configured for generating optical signals representative of a fraction of an incident X-ray beam passing through the object. The plane of the scintillator is parallel to the X-ray beam. The LAD further includes a two dimensional array of photo-conversion elements for receiving a number of X-rays and configured to generate a corresponding number of electrical signals. The arrangement of the photo-conversion elements is independent of the X-ray paths.

In another embodiment, a system for scanning an object having an arbitrary geometry is provided. The system includes at least one detector configured for generating electrical signals representative of an incident X-ray beam passing through the object. The detector includes a scintillator and a two dimensional array of photo-conversion elements. The system further includes a processor coupled to the detector. The processor is configured to determine an X-ray path geometry from the two dimensional array. The X-ray path geometry includes at least one X-ray path, which passes through at least one of the photo-conversion elements. The processor is further configured to determine an energy deposition profile for at least one segment of the X-ray paths and generate an image of the object based on the energy deposition profile and the X-ray paths.

In another embodiment, a method for inspecting an object is provided. The inspection method includes impinging an incident X-ray beam on the object and receiving the X-ray beam passing through the object with a detector. The detector includes a scintillator and a two dimensional array of photo-conversion elements and the scintillator is aligned parallel to the x-rays. The inspection method further includes determining an X-ray path geometry from the two dimensional array, wherein the X-ray path geometry includes at least one X-ray path. The inspection method further includes determining an energy deposition profile for at least one segment of each of the X-ray paths and generating an image of the object using the X-ray paths and the energy deposition profile.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 2:
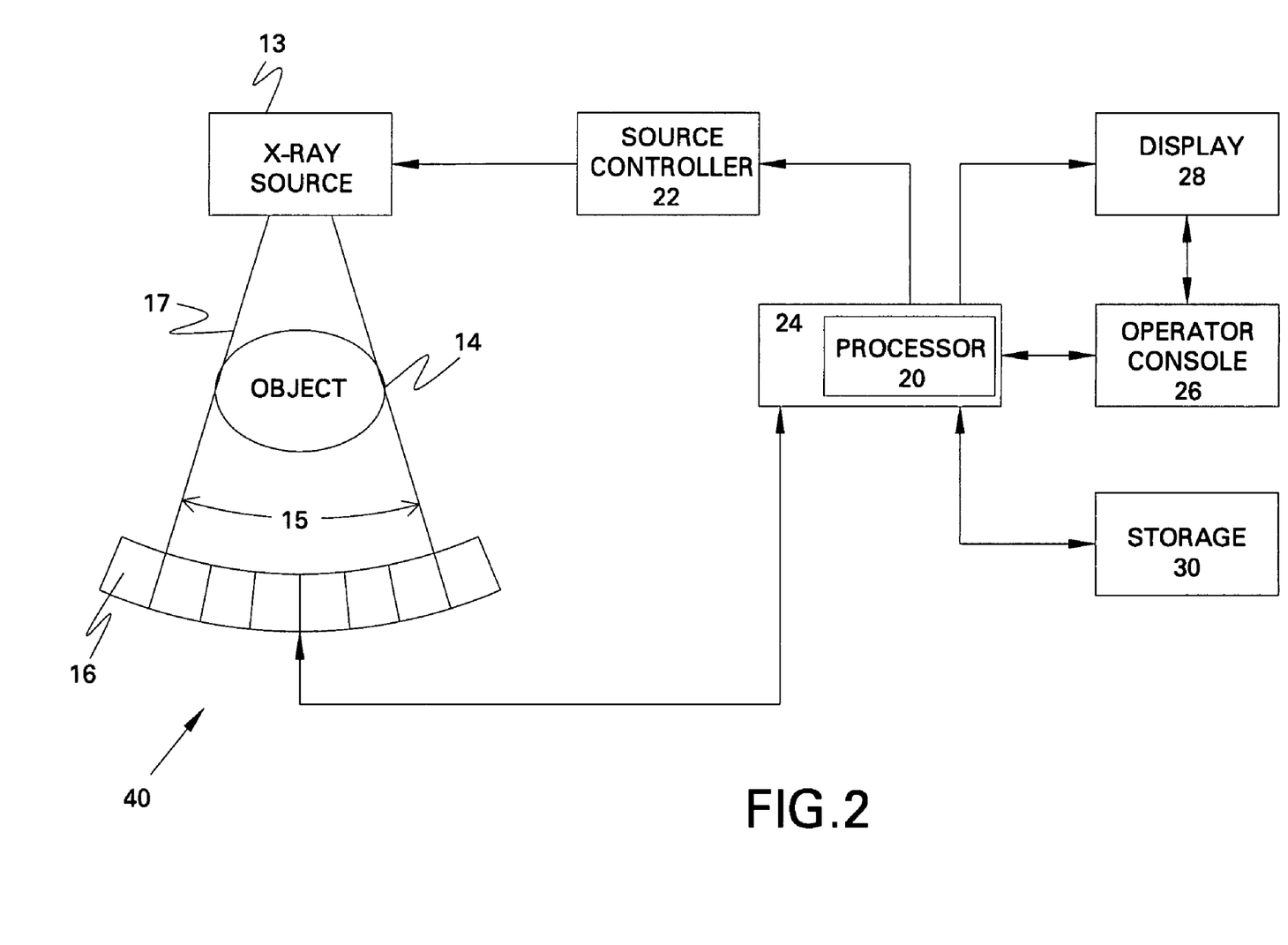
FIG. 2 is a block diagram of a digital radiography system for generating images implemented according to one aspect of the invention.

FIG. 2 is a block diagram of an embodiment of a system 10, which is an X-ray system designed both to acquire original image data and to process the image data for display and analysis in accordance with the present technique. Other imaging systems such as computed tomography system and digital radiography systems, which acquire image three dimensional data for a volume, also benefit from the present techniques. The following discussion of X-ray system 10 is merely an example of one such implementation and is not intended to be limiting in terms of modality.

As used herein, "adapted to", "configured" and the like refer to devices in a system to allow the elements of the system to cooperate to provide a described effect; these terms also refer to operation capabilities of electrical or optical elements such as analog or digital computers or application specific devices (such as an application specific integrated circuit (ASIC)), amplifiers or the like that are programmed to provide an output in response to given input signals, and to mechanical devices for optically or electrically coupling components together.

As indicated in FIG. 2, X-ray system 10 includes an X-ray source 13 configured to emit X-ray radiation through object 14. Object 14 may include turbine blades, baggage, pipes and also the human body, a portion of the human body and animals. X-ray source 13 may be a conventional x-ray tube producing x-rays having both high energy and low energy x-rays. Typically, the end-point energy of the X-rays varies from about 30 keV to about 16 MeV. The X-rays continue through object 14 and, after being attenuated by the object, impinge upon linear array detector 16. Linear array detector (LAD) 16 is a scintillation based LAD is described in further detail with reference to FIG. 5. The linear array detector, with individual photoconversion elements operated in the energy integration mode, is configured to accommodate photon count rates up to the order of gigahertz levels.

Processor 20 receives signals from the linear array detector 16 and is configured to generate an image corresponding to the object being scanned. The processor is configured to determine an X-ray path geometry and determine an energy deposition profile for at least one segment of each of the X-ray paths. The processor is further configured to generate an image of the object based on the energy deposition profile and the X-ray paths. The optimum segments of energy deposition for a particular application, e.g., for a specific object size and type and source energy, can be determined in a post-data acquisition fashion by a search on the dependence of image quality and material-specific detectability on X-ray path geometry. The manner in which the image is generated based on the X-ray path geometry and the energy deposition profile is described in further detail with reference to FIG. 4

For the exemplary embodiment of FIG. 2, computer 24 communicates with processor 20 to enable an operator, using operator console 26, to view the generated image. The operator may view the image on display unit 28. The generated image may also be stored in storage device 30 which may include hard drives, floppy discs, compact discs, etc. The operator may also use computer 24 to provide commands and instructions to source controller 22. Source controller 22 provides power and timing signals to x-ray source 13.

The X-ray system can be used for various non-destructive applications in digital radiography systems or computed tomography systems, such as material identification, explosive detection, baggage scanning and non-destructive inspection methods. For example, the system can be used to determine corrosion in metallic structures or ceramic cores in turbine blades. Additionally, the system may be used to detect debris in pipes carrying, for example, water, oil, or gas.

Figure 3:
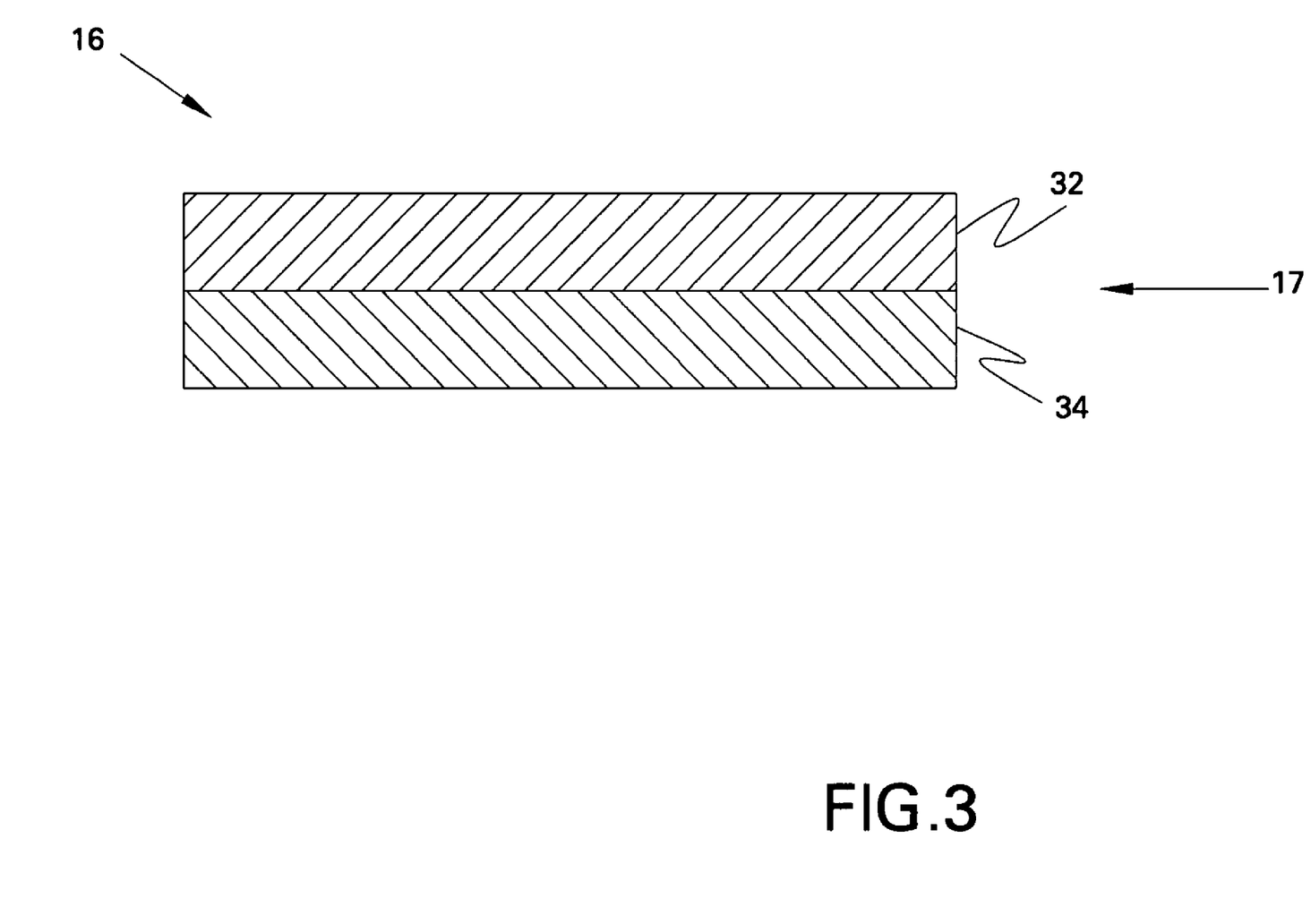
FIG. 3 is side view of one embodiment of a linear array detector.

As shown for example in FIG. 2, linear array detector (LAD) 16 is configured to receive X-rays of varying intensities. FIG. 3 is a side view illustrating one embodiment of linear array detector 16. Each component is described in further detail below.

LAD 16 includes a scintillator layer 32 configured for generating a number of optical signals representative of a fraction of an incident X-ray beam 17 passing through the object 14. For high resolution imaging applications, the thickness of the area scintillator ranges between about 50 microns ($50 \times 10^{-6}$ meters) to about 1000 microns ($1000 \times 10^{-6}$ meters). For medium resolution imaging applications, the thickness of the area scintillator ranges between about 1 mm to about 5 cm. Examples of scintillators include cesium iodide (fiberized and solid), gadolinium oxysulfide, and cadmium tungstate. The volume of the scintillator receives the incident X-ray beam.

The LAD further includes a two-dimensional array 34 coupled to the scintillator layer. The two dimensional array is configured for converting optical signals to corresponding electrical signals that may include pulse signals. Each pulse signals represents a fraction of the energy deposited in the scintillator.

The two dimensional array includes a number of photo-conversion elements as will be described in further detail in FIG. 5. In one embodiment, the two-dimensional array comprises an amorphous silicon flat panel. As can be seen from FIG. 3, a plane of the scintillator layer is parallel to X-ray beam 17.

Figure 4:
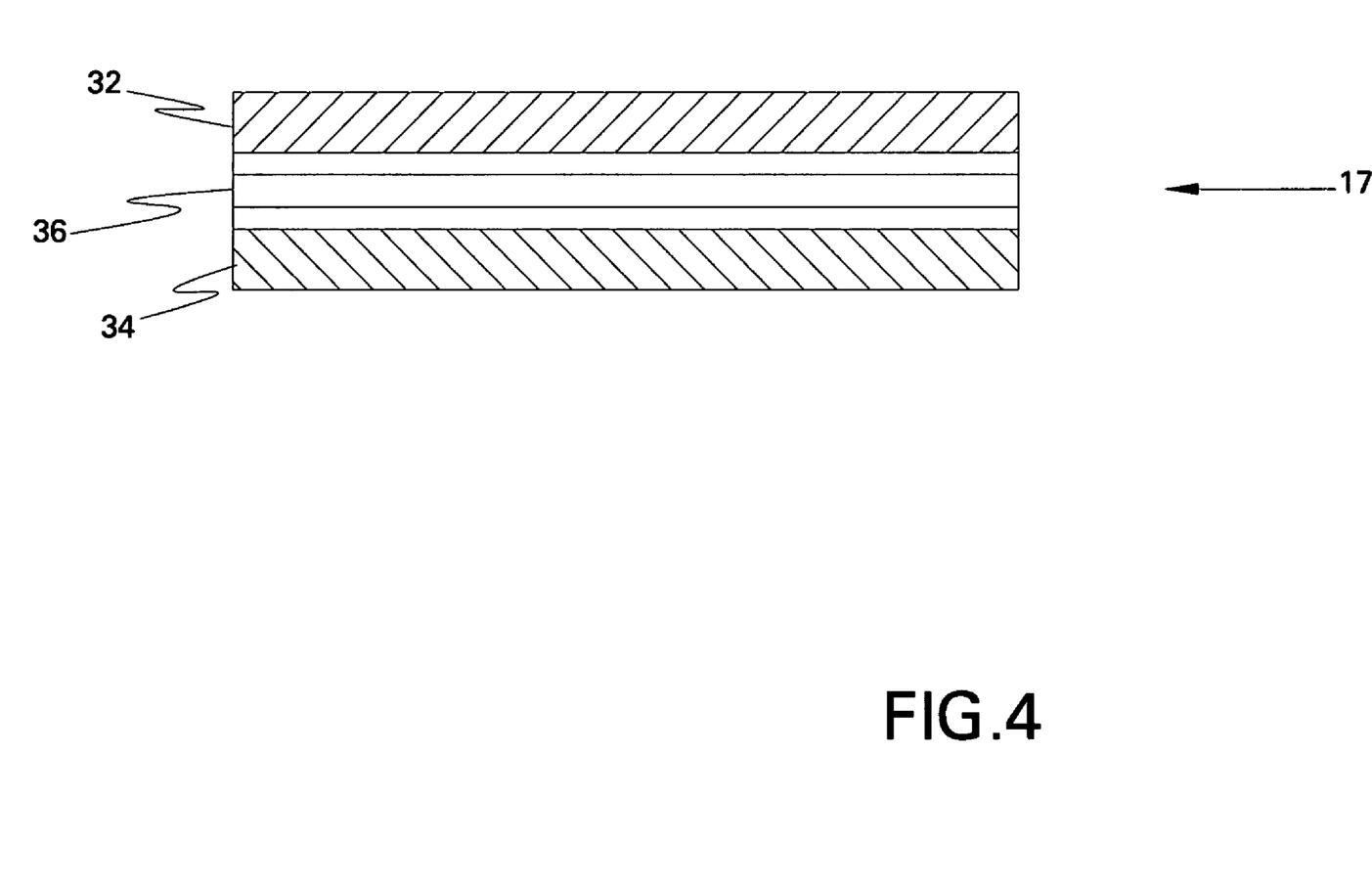
FIG. 4 is side view of another embodiment of a linear array detector.

FIG. 4 is a side view of an alternate embodiment of the LAD 16, which further includes a light deliver means 36 disposed between the scintillator layer 32 and the two-dimensional array 34. The light delivery means is configured for efficiently transporting the optical signals to the two-dimensional array of photo-conversion elements. One exemplary light delivery means is a fiber optic layer, for example a fiber optic plate. Other exemplary means include tapered light pipes and optical systems which typically involve focusing and directing of the light with lenses and reflection mirrors to the area of the photo-conversion device. As can be seen from FIG. 4, a plane of the scintillator layer is parallel to X-ray beam 17.

Figure 5:
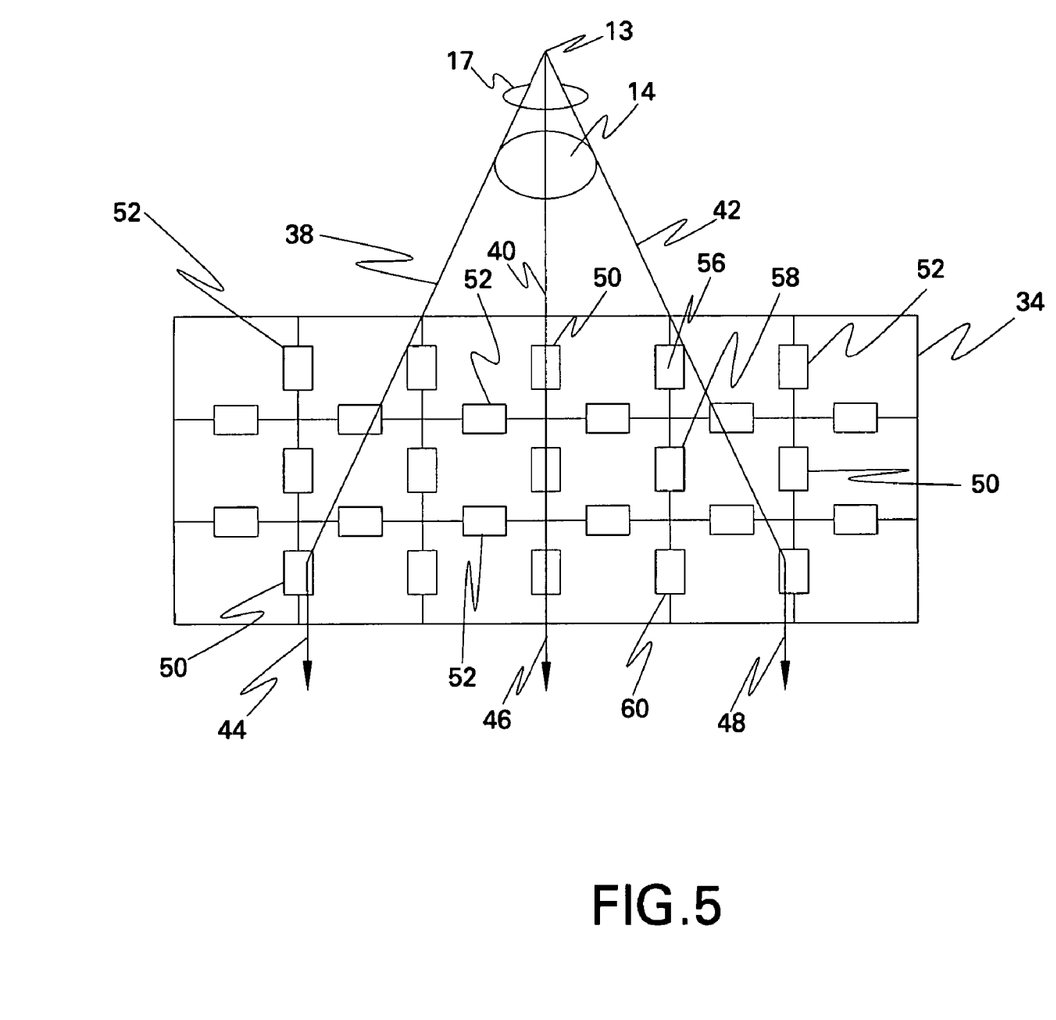
FIG. 5 is a diagrammatic view of one embodiment of a two dimensional array of photosensor elements.

FIG. 5 is a diagrammatic top view of one embodiment of a two-dimensional array 34. Although the scintillator layer (not shown in FIG. 5) converts the X-ray beam 17 passing through the object into a number of optical signals, the path taken by a particular X-ray is referred to herein as an X-ray path. The light generated by X-ray attenuation along a particular X-ray path and transmitted to the two dimensional array leads to a signal associated with the particular X-ray path. FIG. 5 illustrates three such X-ray paths, which are represented by reference numerals 38, 40 and 42 respectively. The two dimensional arrays converts the optical signals on X-ray paths 38, 40 and 42 to electrical signals represented by 44, 46 and 48 respectively.

The two dimensional array 34 includes a number of photo-conversion elements configured for converting the optical signals to corresponding electrical signals. In one embodiment, the photo-conversion elements are photodiodes. In the illustrated figure, the photo-sensors that align with one of the X-ray paths are represented by reference numeral 50. The photo-sensors that are not aligned with one of the X-ray paths are represented by reference numerals 52, 56 and 58.

As can be seen from FIG. 5, the arrangement of the photo-conversion elements is independent of the X-ray path and can be a regular arrangement or an irregular arrangement. Thus, while scanning another object, the X-ray paths may be aligned with photoconversion elements 52, 56 and 58. Thus, the linear array detector is capable of scanning a number of geometries because the arrangement of the photo-conversion elements is not dependent on the X-ray path.

In the illustrated embodiment, the photo-conversion elements are arranged in the form of an orthogonal grid pattern. The angle between two photo-conversion elements such as 50 and 52 is ninety degrees. It may be noted that the angles between the two photo-conversion elements may be different for different embodiments of the LAD. The LAD as described above may be used in various systems such as energy-integrating digital radiography system and energy-integrating computed tomography system.

Figure 6:
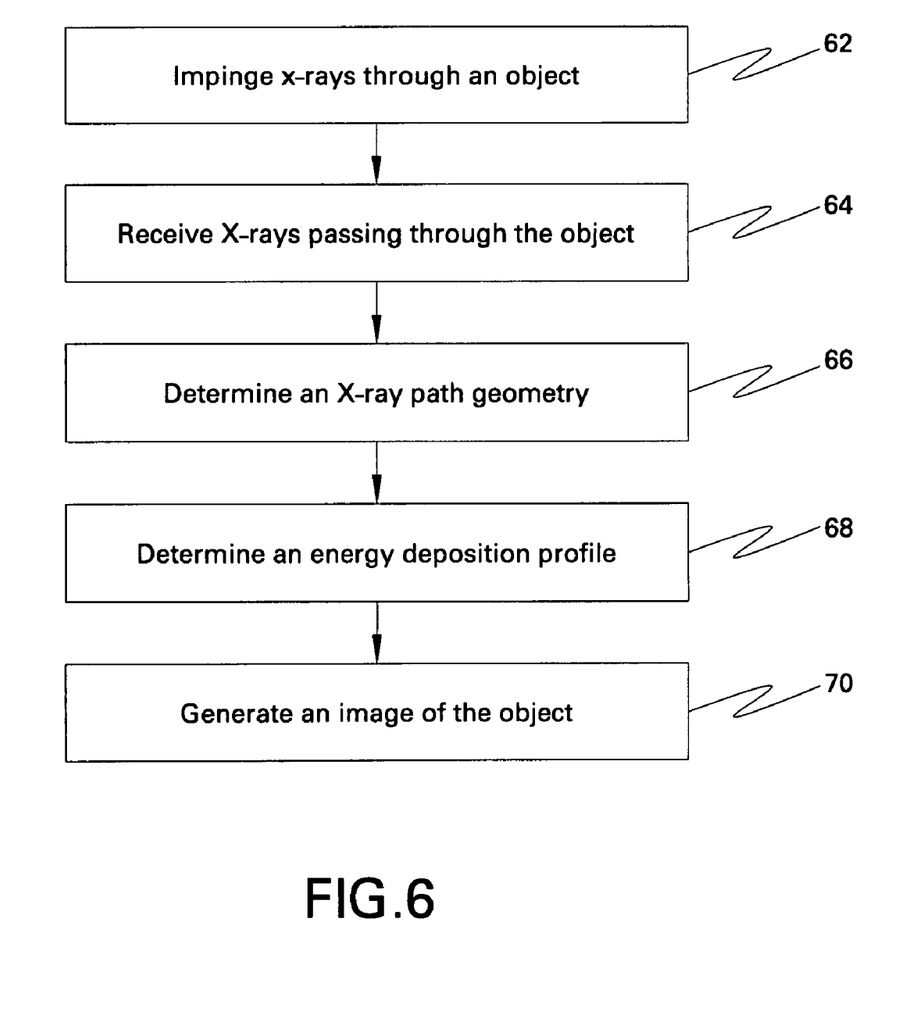
FIG. 6 is a flow chart illustrating one method by which an object can be imaged using a linear array detector.

FIG. 6 is a flow chart illustrating one inspection method by which an object can be imaged using a linear array detector. In step 62, an X-ray beam is impinged on an object using an X-ray source. In step 64, the X-ray beam that passes through the object is received by a linear array detector (LAD). In one embodiment, the LAD detector includes a scintillator layer and a two dimensional array of photo-conversion elements.

In step 66, an X-ray path geometry from the two dimensional array is determined by a processor. The X-ray path geometry includes at least one X-ray path. The X-ray path passes through at least one photo-conversion element of the two dimensional array. The X-ray path has a corresponding energy deposition profile with a granularity established by the impinging X-ray beam on the scintillator layer, the composition and depth of a scintillator material used in scintillator layer and a pixel pitch of the recorded image.

In one embodiment, the X-ray path geometry is determined by imaging at least one fiducial. In one embodiment, the fiducials are imaged by placing tungsten pins in a known configuration within imaging field-of-view 15. Imaging of the fiducials facilitates the mapping of the X-ray path geometry for a particular source-to-detector distance (SDD) to the energy deposition recorded by a regular or irregular grid of photo-conversion elements.

In step 68, an energy deposition profile is determined for at least one segment of each of the X-ray paths. In a further embodiment, the energy deposition profile is binned into at least two segments of deposition, each segment of deposition corresponding to energy deposition associated primarily with specific X-ray energies or with a particular range of energies (e.g., relatively low or high energies in a polychromatic x-ray spectrum).

In a more specific embodiment, the energy deposition profile is binned into a first segment and a second segment of deposition. The first segment corresponds to low-energy X-rays and the second segment corresponds to high-energy X-rays. The segments may be contiguous segments of deposition or non-contiguous segments of deposition.

In step 60, an image of the object is generated using the X-ray paths and the energy deposition profile. In one embodiment, the image of different constituents of object 14 is further processed by using the energy deposition profile corresponding to the high-energy X-rays and to the low-energy X-rays to increase material-specific detection capability.

Figure 7:
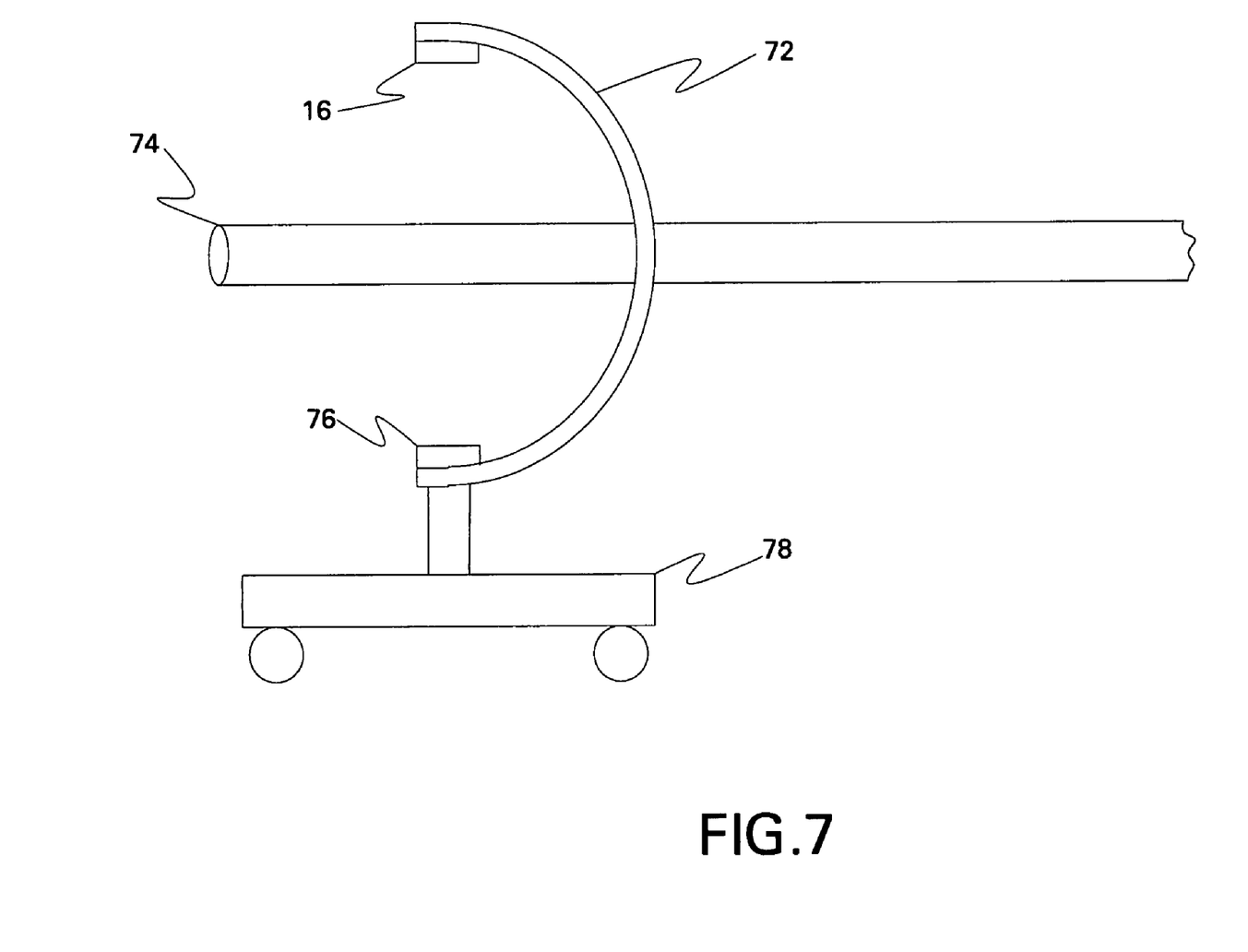
FIG. 7 is one embodiment of a computed tomography system configured for inspecting pipes.

As described earlier with reference to FIG. 1, the method may be used in digital radiography systems and computed tomography systems. Further, the method is adapted for use in non-destructive evaluation (NDE) of materials. One such example is the NDE of turbine airfoils and turbine blades. FIG. 7 is a block diagram illustrating one method by which pipes may be inspected according to one aspect of the invention.

Non-destruction evaluation of materials may also be used for the inspection of pipes for cracks, corrosion, or debris in the interior. FIG. 7 is a block diagram of an exemplary C-arm computed tomography (CT) system 72 used for detecting cracks in pipe 74. The CT system is mounted on trolley 78 and X-rays are emitted from source 76 through the pipe so that cracks may be detected over a length of the pipe. The cracks may be detected by using the method described with reference to FIG. 6. In another embodiment, the CT system illustrated in FIG. 7 may also be used to detect debris inside the pipe. In a more specific embodiment, the CT system may be used to detected debris inside a pipe transporting water, gas, or oil.

Figure 8:
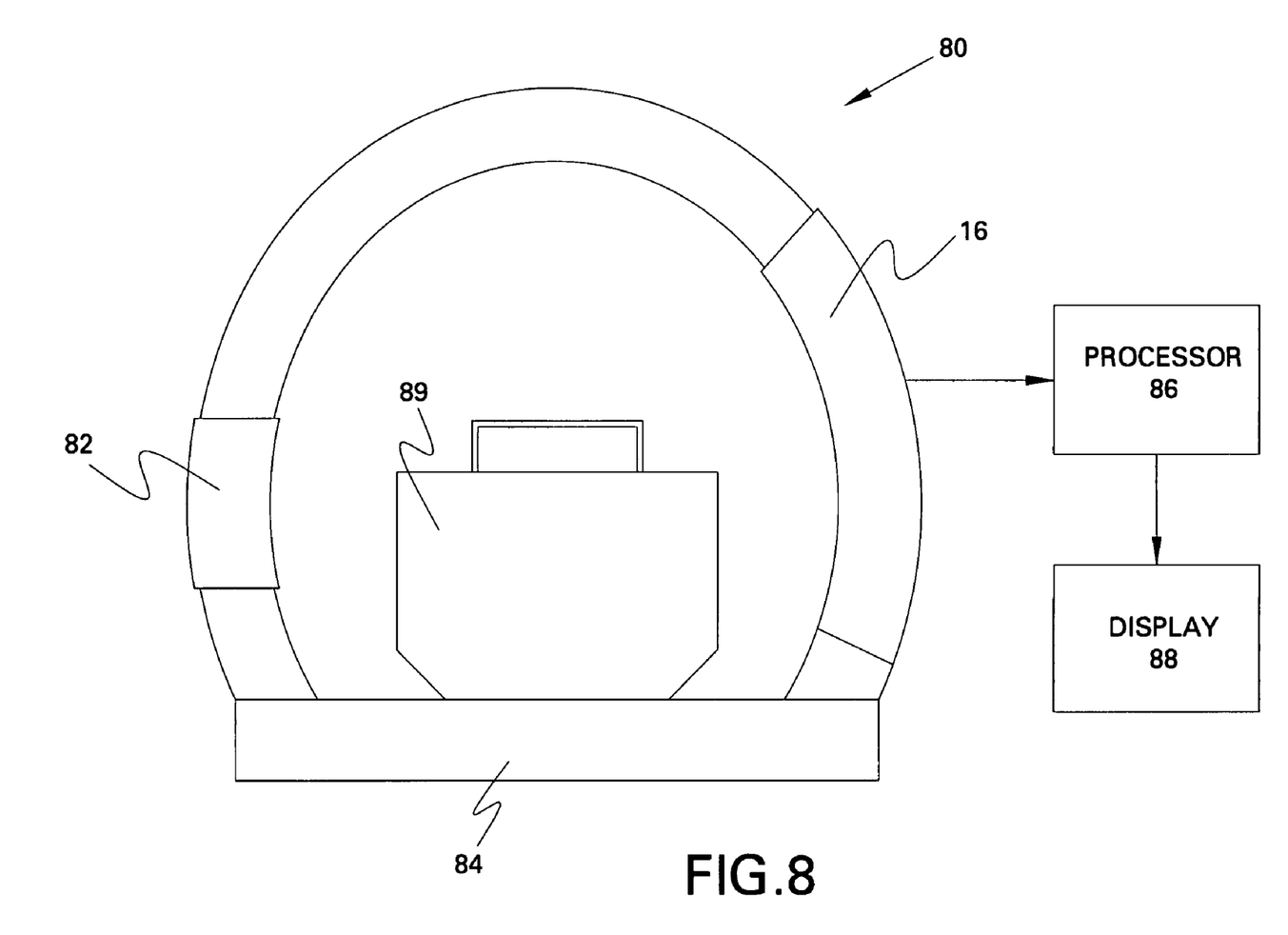
FIG. 8 is a block diagram illustrating an embodiment of a baggage or cargo scanning system.

Non-destruction evaluation of materials may also be used for the inspection of baggage. FIG. 8 is a block diagram of an exemplary baggage scanning system 80 used for detecting explosives or other objects in baggage 92. The baggage is mounted on trolley 84, and X-rays are emitted from source 82 through the baggage. The detector 16, implemented as described with reference to FIG. 2 and FIG. 3, receives the X-ray beam. Processor 86 employs the method described with reference to FIG. 6 for detecting explosives and other objects in the baggage. The contents of the baggage may be displayed to a user using the baggage scanning system via display 88. Similar approaches could be used for cargo inspection for explosives and contraband detection.

Figure 9:
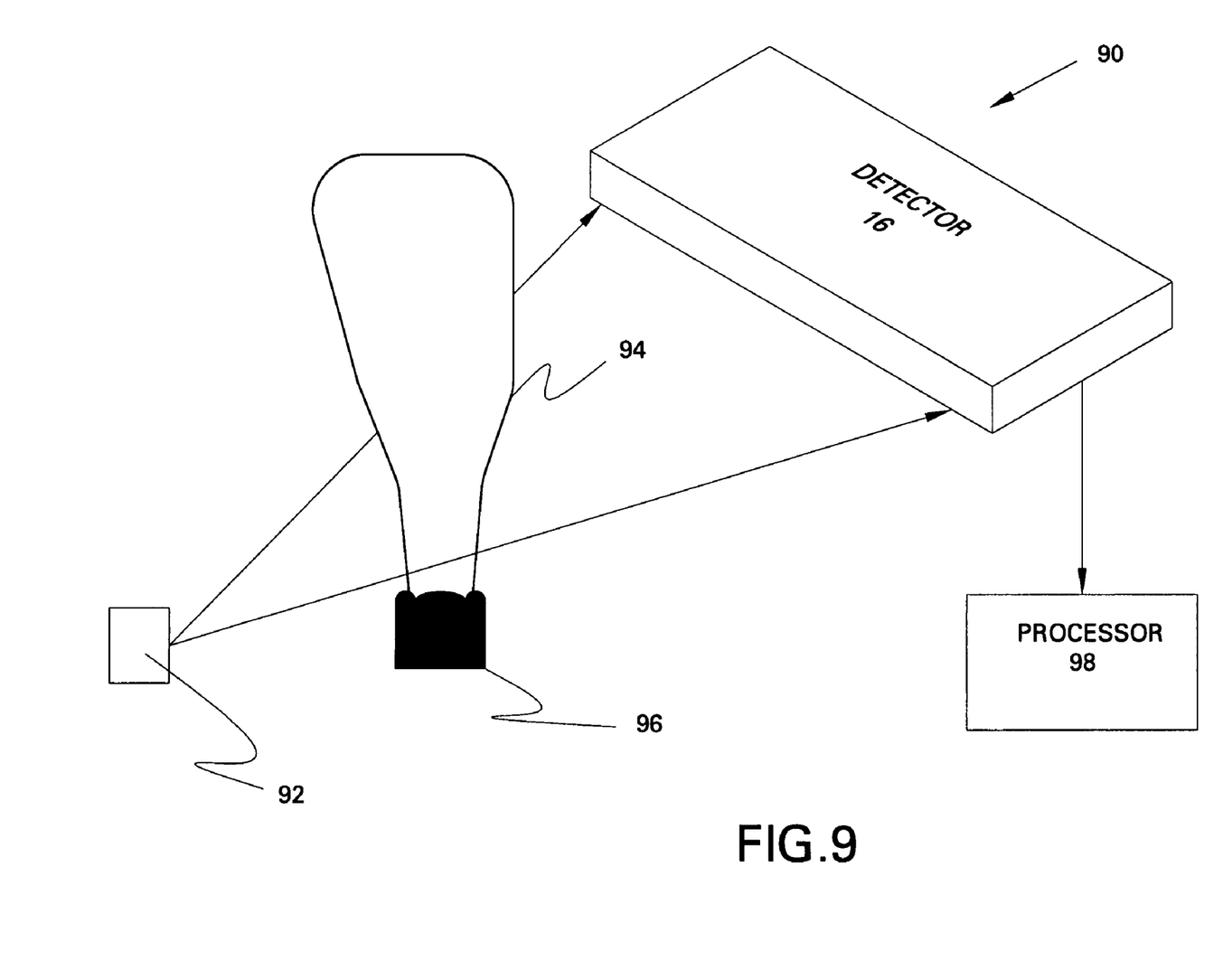
FIG. 9 is a block diagram illustrating an embodiment of a turbine blade inspection system.

NDE may also be used for the evaluation of turbine blades. FIG. 9 is a block diagram of an exemplary turbine inspection system 90 used for inspecting defects in turbine blades. An example of a defect is a presence of a residual core in the turbine blade. The turbine blade is mounted on support 96, and X-rays are emitted from source 92 through the turbine blade. The detector 16, implemented as described with reference to FIG. 2 and FIG. 3, receives the X-ray beam. Processor 98 employs the method described with reference to FIG. 6 for detecting defects in the turbine blade.

The above-described invention has several advantages including flexibility in the initial scanning geometry as the linear array detector (LAD) detector can be configured to scan at any source-to-detector distance that is optimum for scanning of objects with a particular detector field of view. Processing of the energy deposition profile in a post data acquisition process allows the utilization of any distance within a large range between about 1 cm to about 1200 cm.

Additionally, the establishment of the X-ray path is accurate and does not require precise physical alignment of the detector with respect to the centerline of the object, as the geometrical calibration afforded by the imaging of fiducials establishes the geometry of the x-ray paths irrespective of the particular orientation of the detector with respect to the ray path geometry.

When the linear array is used with appropriate thickness, the use of the solid sheet or layer of scintillator with limited thickness or a fiberized scintillator provides for spatial resolution. Also, the linear array detector provides high detection efficiency for a large range of source energies due to the extended depth of the area scintillator.

The linear array detector is also of high efficiency as an energy discrimination detector because the spectrum impinging on the detector during a single scan can be separated into regions associated with attenuation of low energy X-rays and high energy X rays, thus obviating the need for a second scan with a different X-ray spectrum.

The linear array detector is also capable of separating attenuation of events as a function of depth along a given X-ray path and the corresponding separation of low energy X-ray attenuation and high energy X-ray attenuation. This provides for dynamic, post processing optimization of energy discrimination sensitivity using software, achieved as a data processing step.

Also, the linear array detector is configured to accommodate relatively high x-ray count rates (greater than 1 GHz) resulting in high signal quality. Also, the linear array detector can be easily incorporated in various imaging systems.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for scanning an object having an arbitrary geometry, the system comprising:
   at least one detector configured for generating electrical signals representative of an incident X-ray beam passing through the object, wherein the detector comprises a scintillator and a two dimensional array of photo-conversion elements; and
   a processor coupled to the detector and configured to:
      determine an X-ray path geometry from the two dimensional array, wherein the X-ray path geometry comprises at least one X-ray path, and wherein the X-ray path passes through at least one of the photo-conversion elements,
      determine an energy deposition profile for at least one segment of each of the at least one X-ray path, and
      generate an image of the object based on the energy deposition profile and the X-ray paths.

2. The system of claim 1, wherein the processor is configured to determine the X-ray path geometry based on imaging at least one fiducial.

3. The system of claim 2, wherein the processor is further configured to bin the energy deposition profile into at least two segments of deposition.

4. The system of claim 3, wherein the processor is further configured to determine a plurality of optimal segments of energy deposition for an application in a post-data acquisition fashion.

5. The system of claim 4, wherein the processor is configured to perform a search to determine a dependence of at least one of an image quality and a material-specific detectability on the X-ray path geometry.

6. The system of claim 5, wherein the application corresponds to an object size, an object type, and a source energy.

7. The system of claim 1, wherein the system is used for at least one of non-destructive evaluation and explosives detection.

8. The system of claim 1, wherein the system is a computed tomography system.

9. The system of claim 1, wherein the system is a digital radiography system.

10. An inspection method for inspecting an object, the method comprising;
    impinging an incident X-ray beam on the object;
    receiving the X-ray beam passing through the object with a detector, the detector comprises a scintillator and a two dimensional array of photo-conversion elements, wherein the scintillator is aligned parallel to the X-ray beam;
    determining an X-ray path geometry from the two dimensional array, wherein the X-ray path geometry comprises at least one X-ray path;
    determining an energy deposition profile for at least one segment of each of the at least one X-ray path; and
    generating an image of the object using the at least one X-ray path and the energy deposition profile.

11. The inspection method of claim 10, wherein determining the X-ray path geometry includes imaging at least one fiducial.

12. The inspection method of claim 10, further comprising binning the energy deposition profile into at least two segments of deposition, wherein each of the segments of deposition corresponds to a respective x-ray energy level.

13. The inspection method of claim 12, wherein the segments comprise contiguous segments of deposition.

14. The inspection method of claim 12, wherein the segments comprise non-contiguous segments of deposition.

15. The inspection method of claim 12, wherein the energy deposition profile is binned into a first and a second segment of deposition, the first segment corresponding to low-energy X-rays and the second segment corresponding to high-energy X-rays.

16. The inspection method of claim 15, further comprising processing the image using the energy deposition profile corresponding to the high-energy X-rays and to the low-energy X-rays to provide a material-specific detection capability.

17. The inspection method of claim 10, wherein the method is adapted for use in non-destructive evaluation (NDE) of materials.

18. The inspection method of claim 17, wherein the NDE of materials include evaluation of turbine airfoils and turbine blades.

19. The inspection method of claim 17, wherein the NDE of materials include the determination of corrosion and inclusions.

20. The inspection method of claim 17, wherein the NDE of materials include the detection of debris inside a pipe, wherein the pipe is used for transporting water, gas, or oil.

21. The inspection method of claim 10, wherein the method is adapted for use in at least one of baggage inspection, cargo inspection and explosives detection.

22. The inspection method of claim 10, wherein the method is adapted for use in digital radiography systems.

23. The inspection method of claim 10, wherein the method is adapted for use in computed tomography systems.

24. The inspection method of claim 10, wherein the detector has a field of view, the method further comprising:
    selecting a source to detector distance for optimal scanning of the object by the detector based on the field of view for the detector; and
    positioning the detector and the object at the source to detector distance prior to performing the impinging step.

* * * * *